Jan. 12, 1965  E. O. DU BUIS ETAL  3,164,946
DOFFING AND DONNING MECHANISM
Filed July 15, 1963  11 Sheets-Sheet 1

INVENTORS
Edwin O. DuBuis
Edward L. Cucksey
Carl E. Lindquist
BY
Johnson and Kline
ATTORNEYS

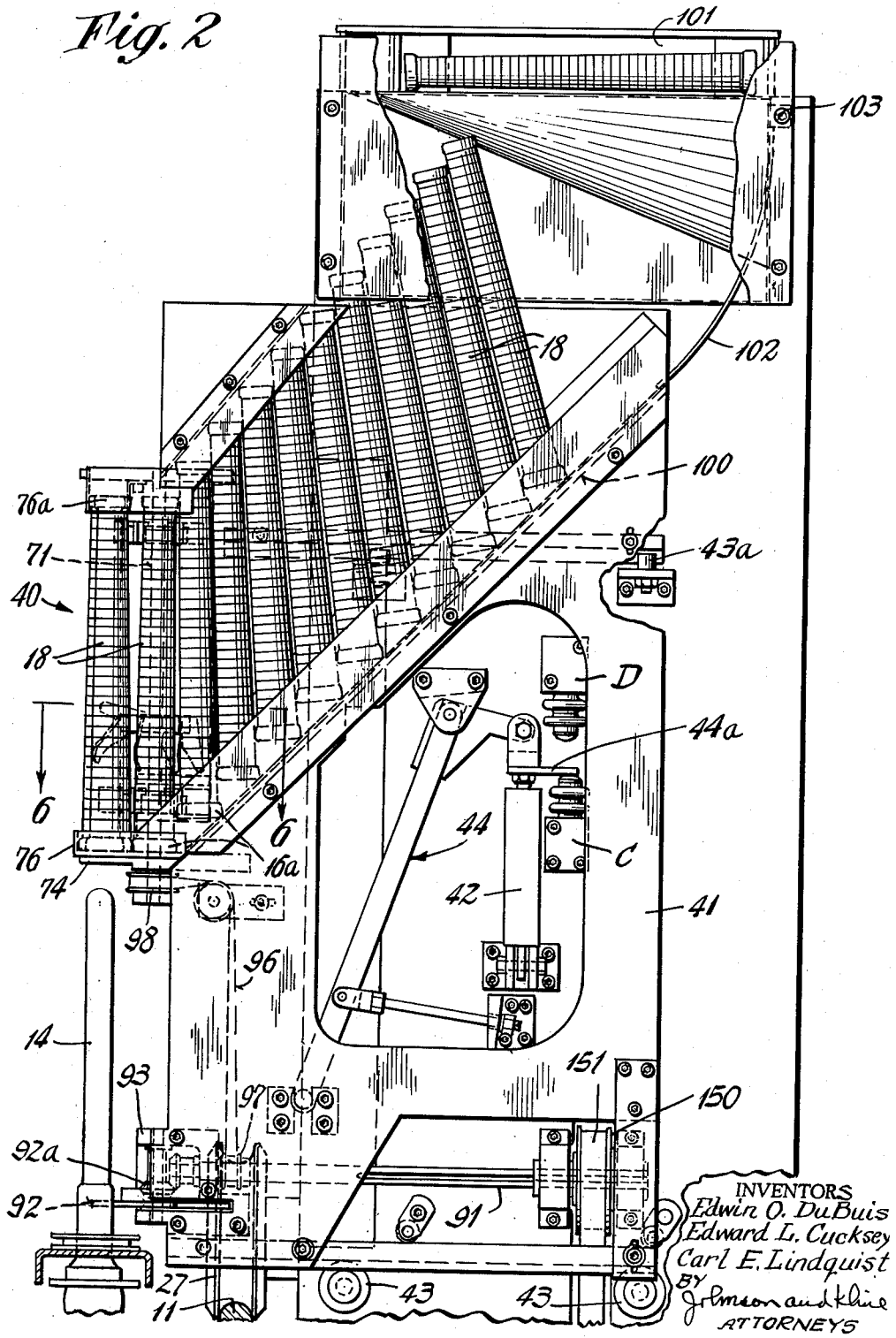

Jan. 12, 1965  E. O. DU BUIS ETAL  3,164,946
DOFFING AND DONNING MECHANISM
Filed July 15, 1963  11 Sheets-Sheet 3
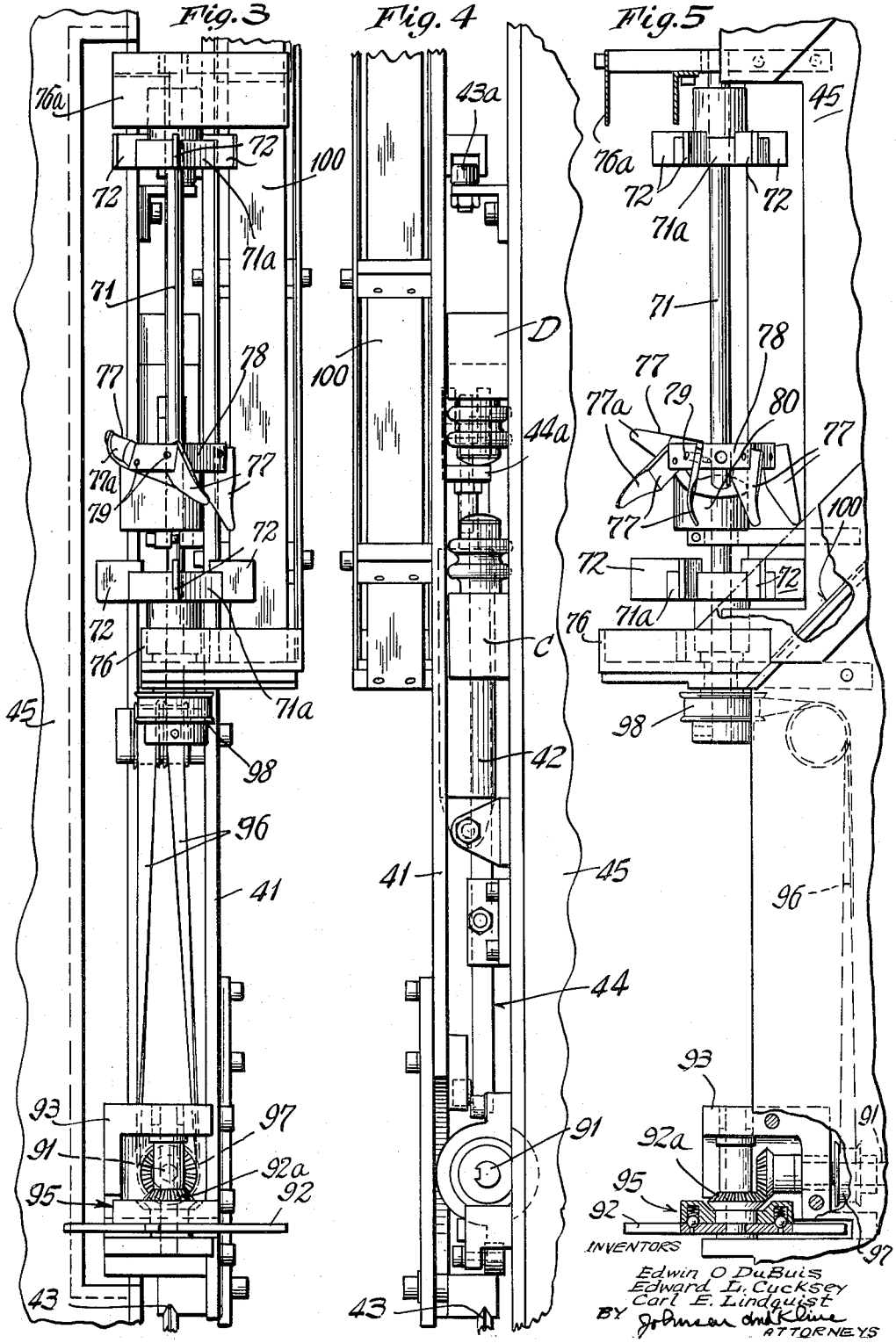

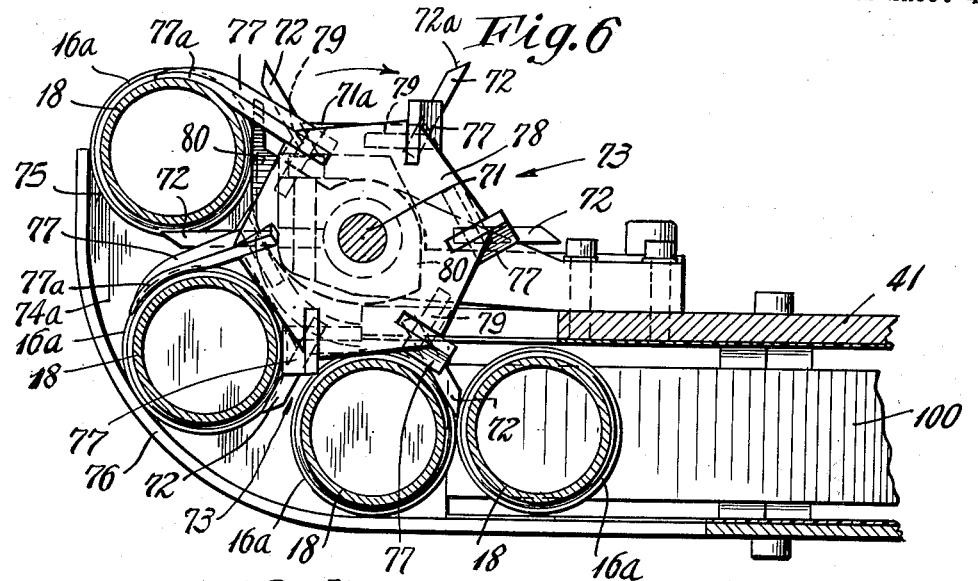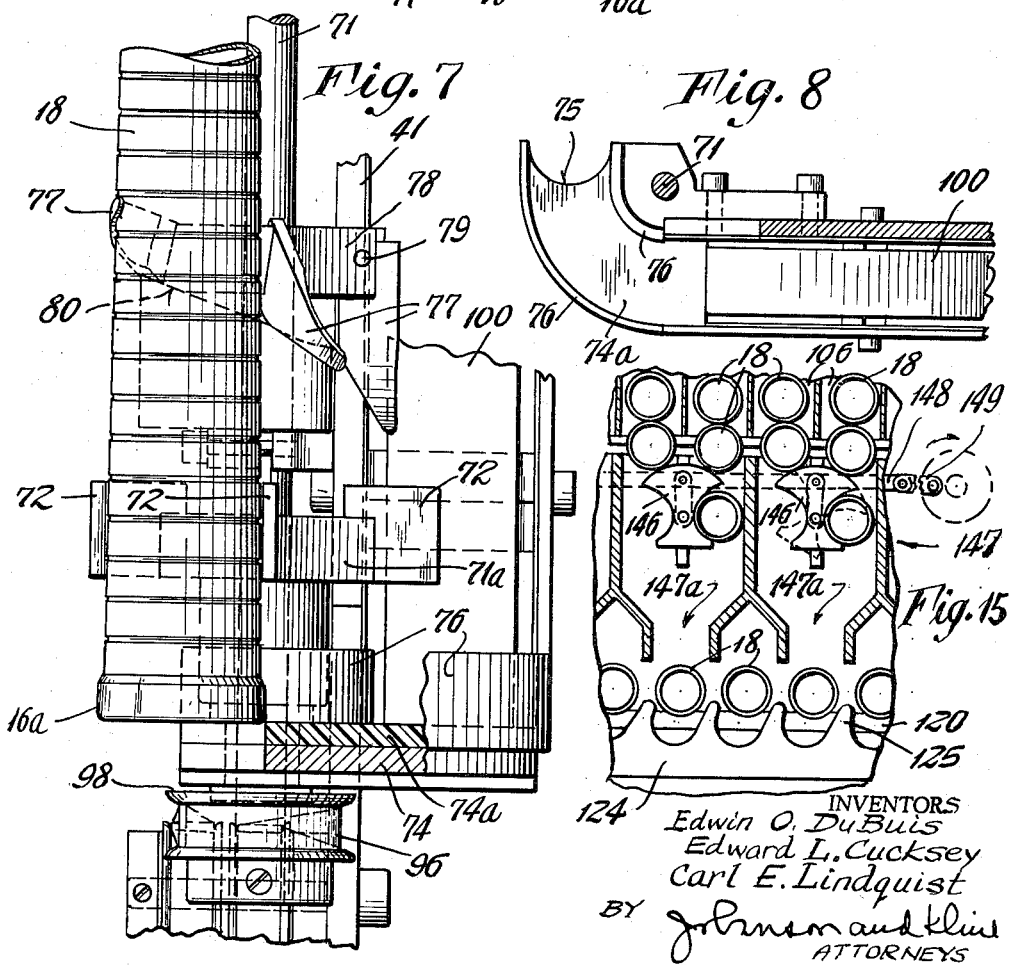

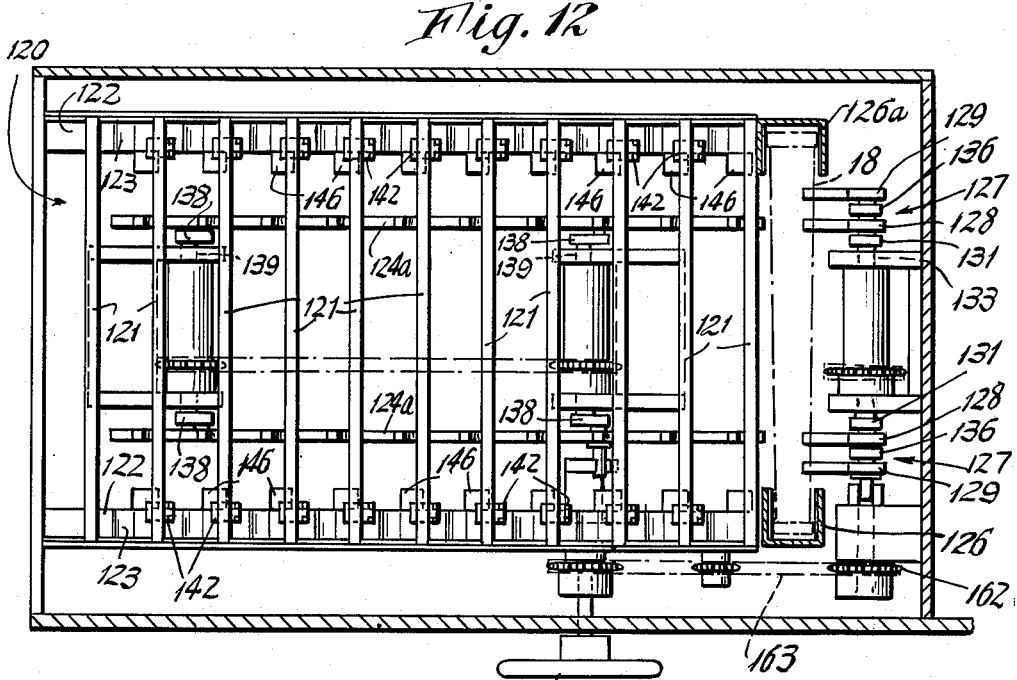
Fig. 12
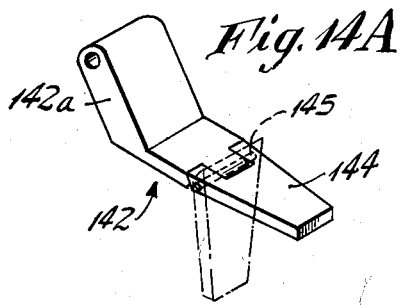
Fig. 14A
Fig. 9
INVENTORS
Edwin O. DuBuis
Edward L. Cucksey
Carl E. Lindquist
BY Johnson and Kline
ATTORNEYS

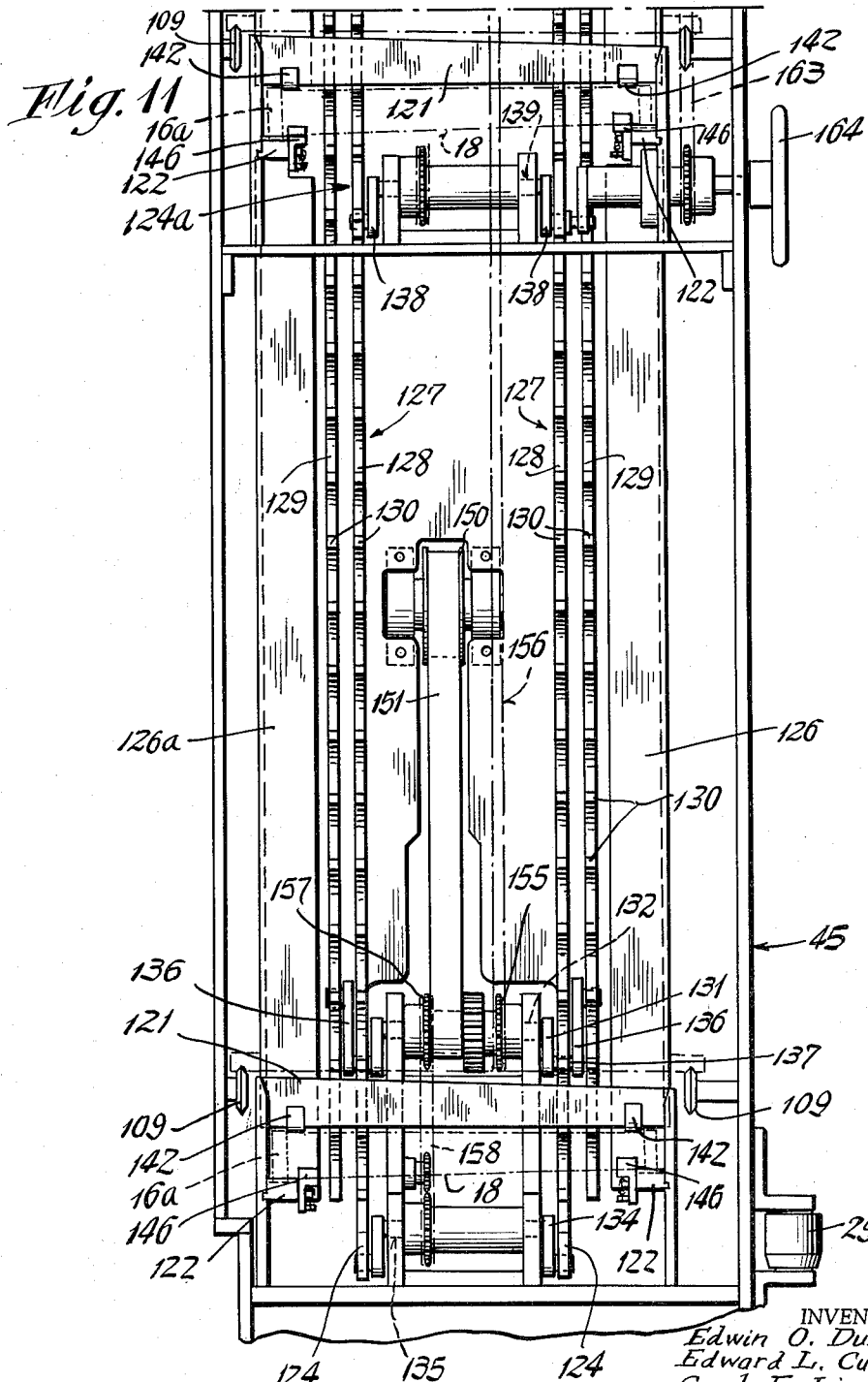

INVENTORS
Edwin O. DuBuis
Edward L. Cucksey
Carl E. Lindquist
BY Johnson and Kline
ATTORNEYS

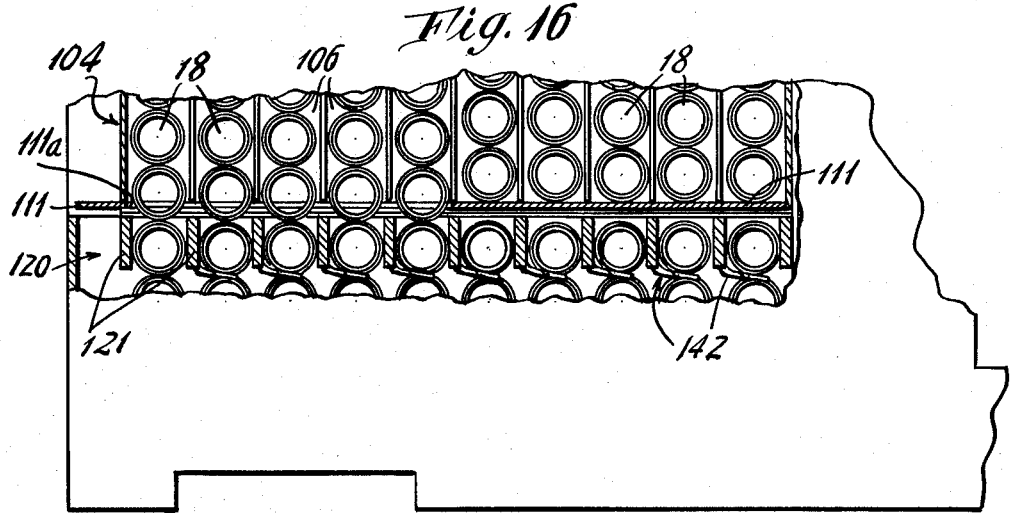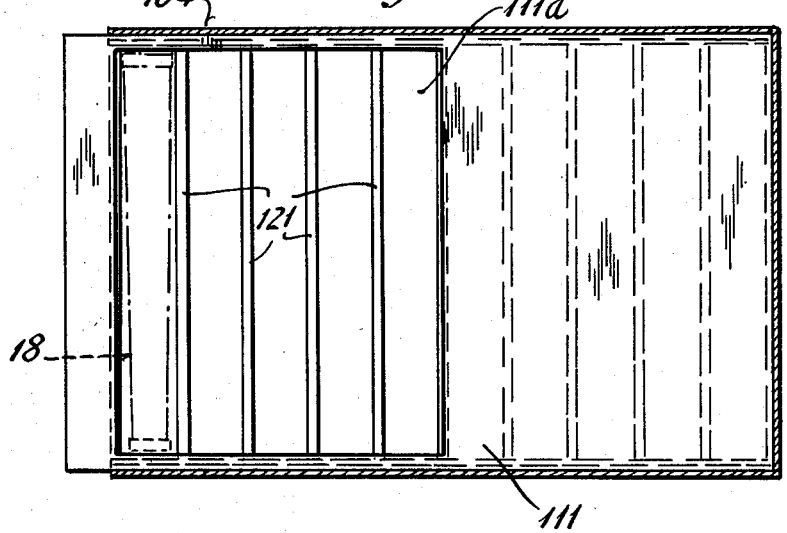

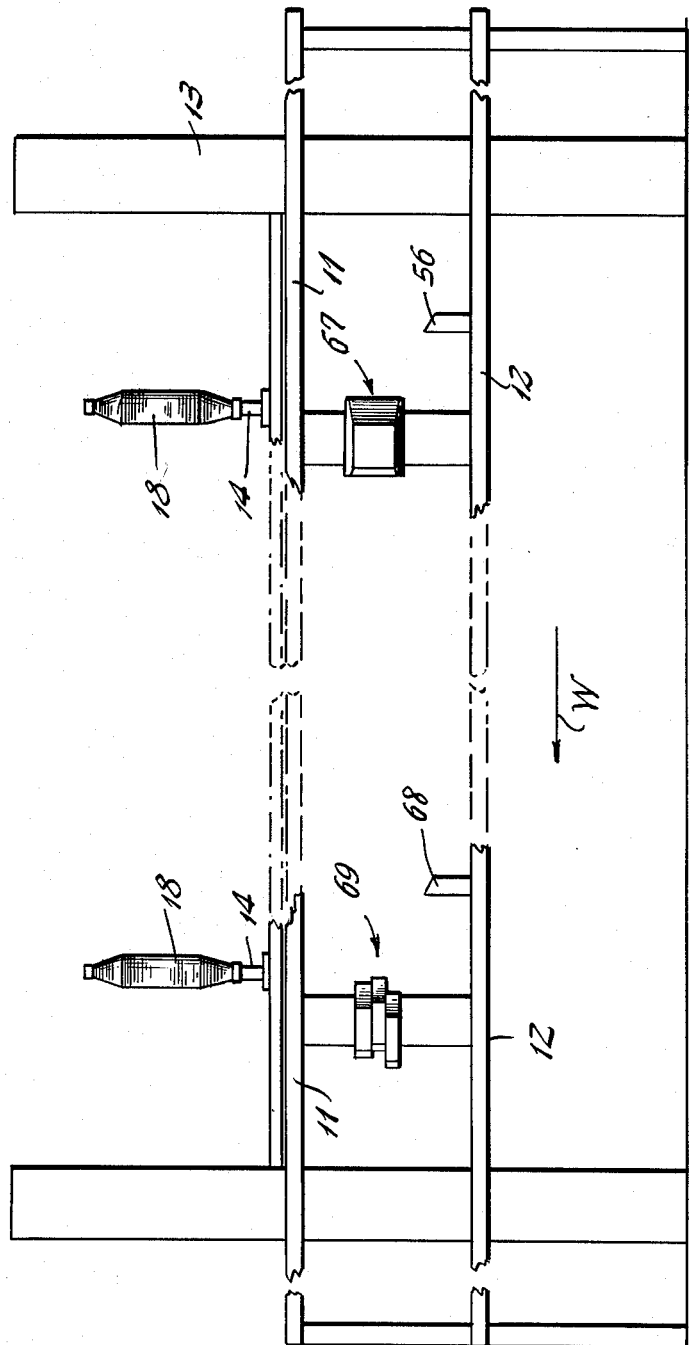

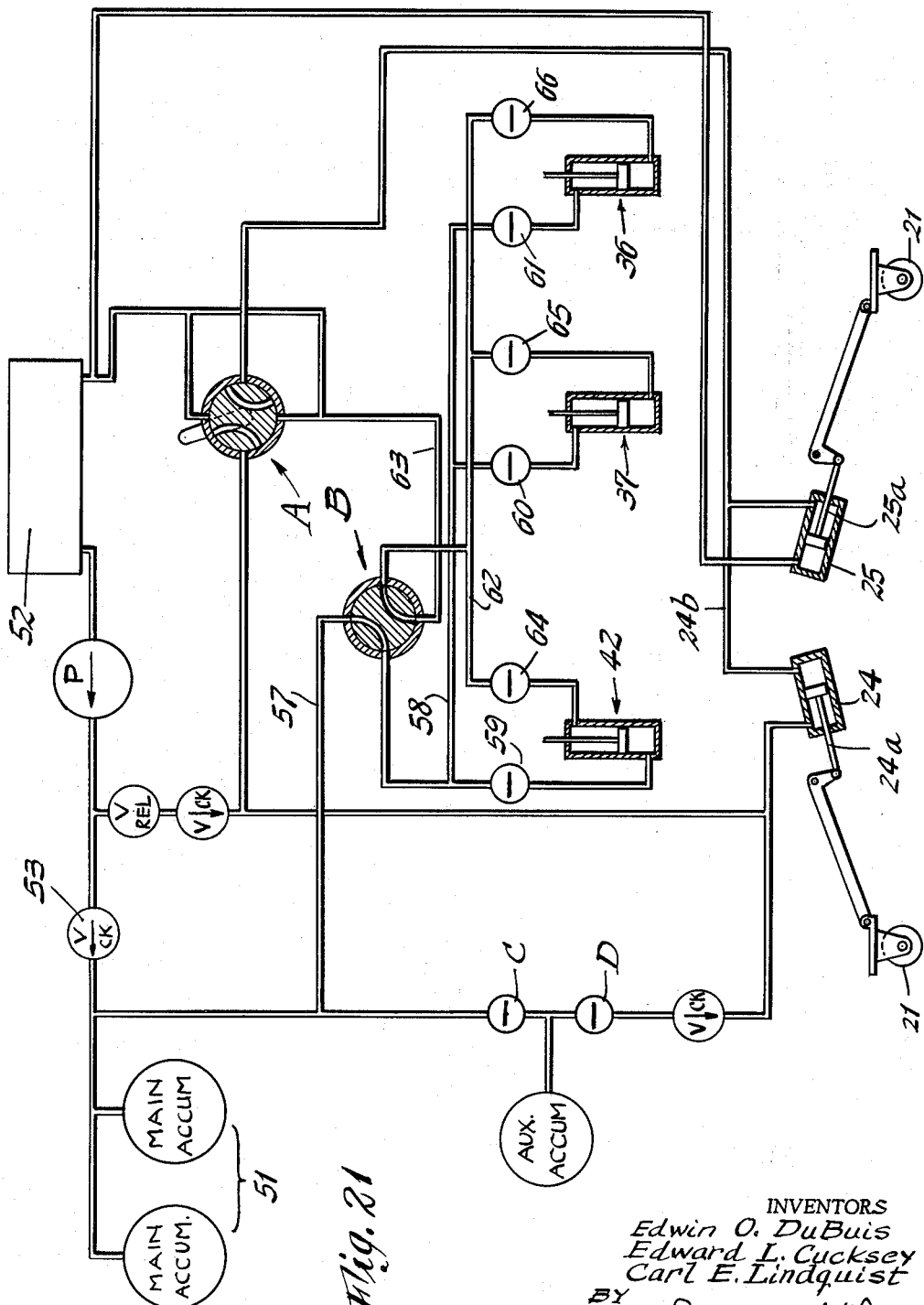

United States Patent Office 3,164,946
Patented Jan. 12, 1965

3,164,946
DOFFING AND DONNING MECHANISM
Edwin O. Du Buis, Pearl River, Edward L. Cucksey, Upper Nyack, and Carl E. Lindquist, Nyack, N.Y., assignors to Willcox & Gibbs Sewing Machine Co., New York, N.Y., a corporation of New York
Filed July 15, 1963, Ser. No. 295,119
27 Claims. (Cl. 57—53)

The present invention relates to an improved doffing and donning device adapted to be mounted on a spinning frame to move therealong and apply empty bobbins to the spindles thereof, particularly to those spindles from which full bobbins have been doffed.

Heretofore, in devices of this type in order to transfer the bobbin from the bobbin applying position to the spindle, spring means providing a hammer blow, as shown in Patent 3,077,725 have been employed to propel the bobbin quickly onto the spindle and to cause it to be impaled thereon.

The present invention provides a simplified construction in which such spring means is eliminated and the bobbin is impaled on the spindle by the force of gravity.

Another object of the present invention is to provide a simplified means for supplying bobbins to the bobbin applying position and to insure that a bobbin is supplied from the supply to the bobbin applying means for each operation thereof in applying a bobbin to a spindle.

Another object of the invention is to provide a novel bobbin feeding means for supplying the donning device with an adequate supply of bobbins and including means controlling the movement of the bobbins from the supply to the bobbin applying means.

A further object of the invention is the provision of a novel control means for the mounting means for the carriage to facilitate its mounting on and removal from a spinning frame.

Other features and advantages of the invention will be apparent from the specification and claims when considered in connection with the accompanying drawings in which:

FIG. 2 is an enlarged detailed front view of the donning device.

FIG. 3 is a front view of the bobbin applying means.

FIG. 4 is a back view of the bobbin applying means.

FIG. 5 is a side view, partly in section, of the bobbin applying means.

FIG. 6 is a detailed view along line 6—6 of FIG. 2, partly in section, showing the bobbin control means for controlling the feeding of the bobbins in the bobbin applying position.

FIG. 7 is an enlarged fragmentary side view of the bobbin applying means.

FIG. 8 is a detailed view, partly in section, showing the bobbin supporting portion of the bobbin applying means for supporting the bobbins adjacent the bobbin applying position.

FIG. 9 is a detailed view, partly in section, showing the star wheel drive for the drive shaft for the bobbin feed means and bobbin applying mechanism.

FIG. 11 is a view of the vertical feed means taken on line 11—11 of FIG. 10 with the containers removed.

FIG. 12 is a plan view taken along line 12—12 of FIG. 10 without the bobbins therein and showing the horizontal feed means.

FIG. 14A is an enlarged perspective view of a control element of FIG. 14.

FIG. 15 is a view showing a modified form of bobbin control means.

FIG. 16 is a side view partly in section showing a bobbin supporting means comprising an apertured plate.

FIG. 17 is a bottom view of FIG. 16.

FIG. 18 is an end view showing the means for positioning a closure plate under the bobbin supply.

FIG. 20 is a view of the control cams on the rails for controlling the operation of the carriage mounting means.

FIG. 21 is a diagrammatic view showing an improved hydraulic circuit for the carriage mounting means.

Figure 1:
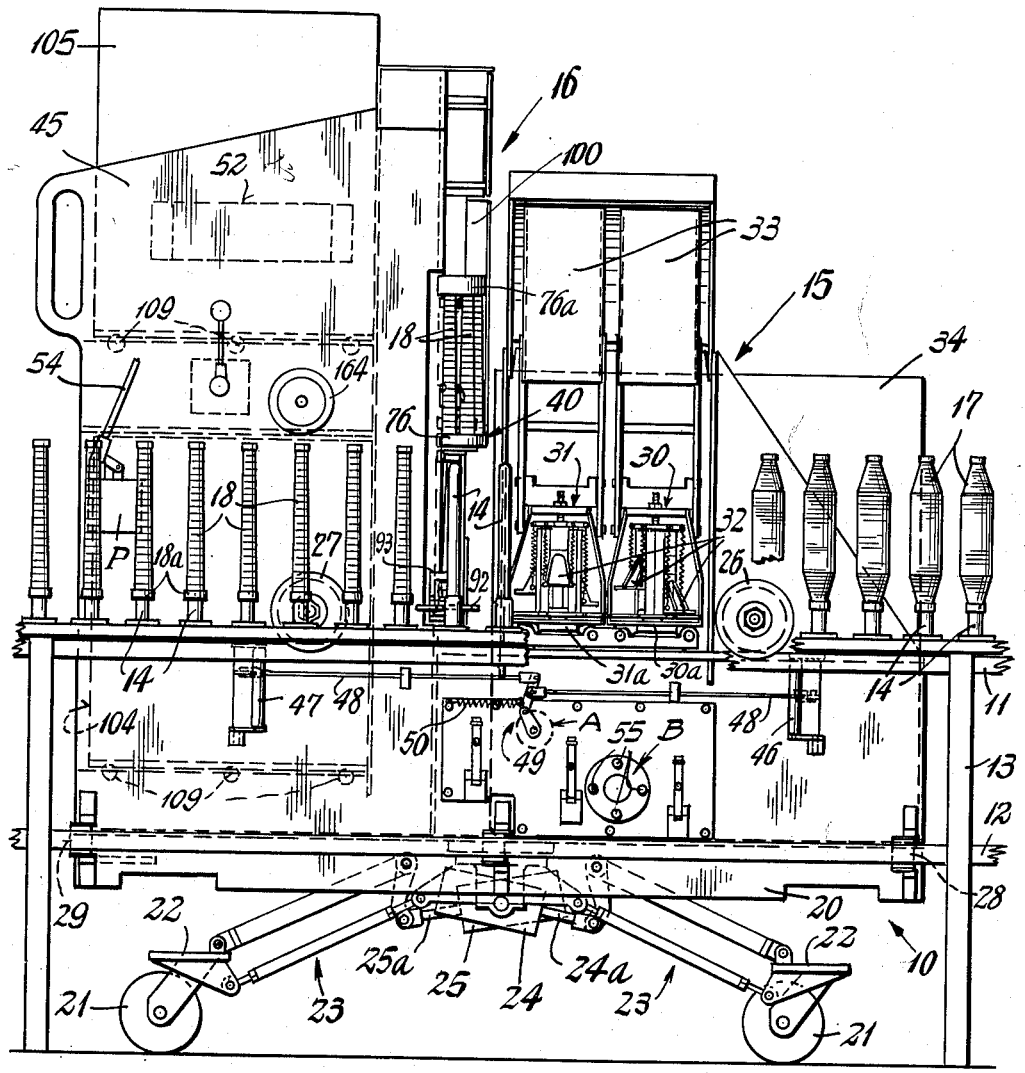
FIGURE 1 is a side elevation of the device mounted on the spinning frame with portions of the spinning frame removed to show more clearly the side facing the spinning frame.

As shown in the drawings, the device of the present invention comprises a carriage 10 adapted to be mounted on rails 11, 12 carried by the side of a spinning frame 13 having a succession of spindles 14 extending therealong and to carry any suitable doffing means 15 and the donning means 16 of the present invention, including the empty bobbin supply therefor, so as to automatically doff the full bobbins or wound packages 17 on the spindles and to replace them with empty bobbins 18 as the carriage is moved along the side of the spinning frame. The bobbins 18, as herein illustrated, are warp bobbins which are uniformly tapered with an enlarged butt 18a and have the usual driving fit with the spindle.

Figure 19:
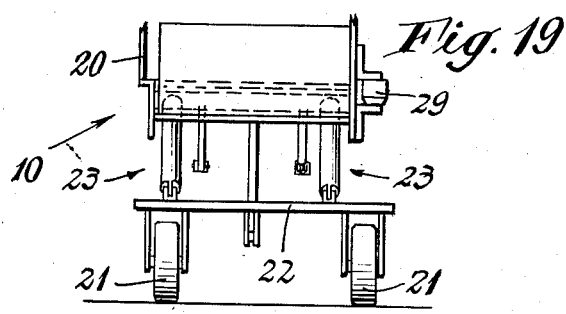
FIG. 19 is a front view of the carriage supporting means.

The carriage, as shown in FIGS. 1 and 19, comprises a rigid frame 20 and is mounted on four floor-engaging wheels or rollers 21 whereby the carriage can be readily moved over the floor of the mill. The floor-engaging rollers 21 are carried by crossbars 22 which are pivotally mounted to the bottom of the carriage by suitable link means 23 and are moved between supporting and retracted positions by means of master and slave cylinders 24, 25 carried by the underportion of the carriage and having their piston rods 24a, 25a connected to said link means 23 as shown in FIGS. 1 and 19.

The carriage also is provided with a pair of rail-engaging wheels 26, 27 which are located on the upper part thereof so as to be supported on the upper rail 11 extending along the spinning frame for movement therealong. The carriage is also provided at its lower portion with stabilizing rollers 28, 29 which are located so as to engage the side of the lower rail 12 to steady the device when it is supported on the rails for movement along the frame.

The carriage has mounted on the forward end thereof a doffing means 15. These may be of various constructions and are herein illustrated as comprising a plurality of doffing units 30, 31 of the type disclosed in Patent No. 3,070,949, each having a plurality of bobbin ejector elements 32 for breaking the bobbins loose on the spindle and ejecting them into chutes 33 to deposit them in a box 34 carried by the lower part of the carriage. The doffing units, as fully described in said patent, are mounted on the carriage by slides 30a, 31a for movement from a retracted position to a projected operative position, in which they cooperate with the wound package, by pistons and cylinders 36, 37 (FIG. 21) connected thereto. They are normally held in retracted position while the carriage is off the spinning frame and are automatically moved into cooperating relation with the spindles when the carriage is mounted on the frame and the doffing units are adjacent the first spindle on the frame as will be explained. They are automatically retracted as they pass the last spindle as will be explained.

The donning device 16 is mounted on the carriage in position to follow the doffing means and includes the bobbin applying means 40 which is carried by a plate 41. The plate is mounted by rollers 43 and 43a for movement on the carriage and is movable by a piston and cylinder means 42 and cooperating linkage means 44 as shown in FIG. 2 from a retracted position when the carriage is off the spinning frame to a projected position when the donning device is adjacent the first spindle on the spinning frame. The carriage also has adjacent the donning device a bobbin supply enclosure 45 for receiving containers of empty bobbins for supplying a bobbin to the bobbin applying means for each bobbin applied to the spindle as will be more fully explained.

A novel hydraulic circuit, as shown in FIG. 21, is provided for controlling and facilitating the mounting and demounting of the carriage on the spinning frame and automatically controlling the positioning of the doffing and donning units.

As shown in FIG. 1, the carriage 10 has thereon a pair of pivoted rail-engaging paddles 46, 47 located adjacent each end and connected by links 48 to a toggle mechanism 49, one link of which is connected to a rotary valve A in the hydraulic system which is urged by a spring 50 to a normal blocking position as shown in FIG. 21.

This system includes a main accumulator means 51 which is supplied by fluid under pressure from the reservoir 52 by a pump P through a check valve 53. Though pump P can be of any type, it is herein illustrated as a manually actuated pump operated by handle 54. As noted, the valve A is normally disposed in the position shown in FIG. 21 wherein it blocks line 24b which connects the slave cylinder and master cylinder to the reservoir. By operating the pump, fluid under pressure is applied to the rod end of the master cylinder 24 which in turn feeds fluid to the rod end of the slave cylinder 25 to cause the wheels to be projected and lift the carriage to position the rail-engaging wheels 26, 27 at an elevation above the rail 11. As the carriage is rolled into position on wheels 21 with the wheels 26, 27 above the rail 11, the paddles 46, 47 will simultaneously engage the rail 11 and will move the valve A, through the linkage mechanism 48, to a position in which the slave and master cylinders are vented to the reservoir and thus causing the de-energization of the cylinders and the lowering of the carriage onto the rail 11 to be supported thereon by the wheels 26, 27. This also frees the floor-engaging wheels or rollers 21 for movement due to irregularities on the floor while the carriage is supported by the rail.

As the carriage moves along the rails in the direction of the arrow W, the lowest of pins 55 on a rotary valve B engages a cam 56 (FIG. 20) on the rail 12 and rotates the valve B through 90° to the position in which the pressure line 57 from the accumulators 51 is connected to the line 58 connected to the head end of the cylinders 36, 37, 42 through normally closed spring-returned poppet valves 59, 60, 61. The valve also connects line 62 to line 63 connected to the reservoir. Line 62 is connected to the rod ends of the cylinders 36, 37 and 42 through normally closed spring-returned poppet valves 64, 65, 66 for operating each of the doffing devices and donning devices.

As the first doffing unit 30 reaches the first spindle, a cam 67 will momentarily actuate the valves 61, 66 and permit the pressure to go to the head end of the cylinder and exhaust the rod end and project the doffing unit and lock the device in projected position. Continued movement of the carriage causes cam 67 to operate valves 60, 65 to project and hold the second doffing unit 31 in projected position and valves 59, 64 to project and hold the donning device in projected position.

Just prior to reaching the end of the frame, the lowest pin 55 engages cam 68 on rail 12 and the valve B is given a 90° rotation. This causes pressure to be applied to the line 62 connected to the rod end of the cylinders through normally closed valves 64, 65, 66 and connects line 58 to the reservoir through normally closed valves 59, 60, 61. As each of the doffing units and donning device get opposite the last spindle, the cam means 69 momentarily opens the normally closed valves, applying pressure to the rod end and exhausting the head of the cylinder and withdrawing and holding the units in retracted position.

When the plate 41 moves forward to its projected position, the portion 44a of the linkage means opens up a normally closed valve C connecting the auxiliary accumulator to the main accumulator line to be charged therefrom. As the machine moves toward the end of the rail, the front paddle will leave the rail while the carriage is supported thereon by the rail engaging wheels. This occurs just prior to the operation of the valves 59, 64 to move the plate 41, causing the valve A to be rotated through 45°, closing off the return paths for the master and slave cylinders to the reservoir. When the valves 59, 64 are operated, the plate carrying the donning mechanism returns to retracted position and portion 44a opens valve D applying pressure to the master cylinder and slave cylinder which lift the carriage sufficiently to permit the wheels 26, 27 to disengage from the rail, whereupon the carriage is supported by wheels 21 to be removed from the frame.

The bobbin applying mechanism 40 is mounted on the donning plate 41 in a position to be located over the spindle when the plate is in a projected position as shown in FIG. 2. The bobbin applying means, as shown in FIGS. 3–7, comprises a vertical shaft 71 rotatable in bearings carried by the plate 41. The shaft is provided with a plurality of radial vanes 72 positioned thereon adjacent the top and bottom thereof and carried by plate 71a adjacent the lower end thereof which in effect form pockets 73 to receive and engage bobbins and advance them over a supporting base plate 74. The base is flat and concentric with the shaft 71 and has a curved forward edge 75 defining a bobbin applying position in which the bobbins supported thereon by their bases 16a are released to fall by gravity onto the spindle located below the bobbin applying position.

Since the movement of the bobbins on the carriage at the time of release by the bobbin applying means is to the left and toward the rear of the carriage as shown in FIG. 1 and in a direction opposite to the movement of the carriage to the right relatively to the spindles, it minimizes the danger of lateral displacement or error between the bobbin and spindle during the interval necessary to impale the bobbin on the spindle.

If desired, the base plate 74 can be provided with a plastic cover 74a of antifriction material to permit the butts to move freely over the surface.

The base plate is also provided with low side walls 76 to confine and guide the butts of the bobbins as they slide thereover and the device has guides 76a concentric with the shaft for guiding the tips.

In order to control the bobbins in bobbin applying position, a plurality of pivoted control fingers 77 are pivotally mounted on a plate 78 on the shaft and are adapted to be projected and engage the bobbins carried in the pockets to hold the bobbins in vertical position and control them as they move off edge 75 in the bobbin applying position, whereupon the bobbins are released and are impaled on the spindles by the force of gravity.

The ends of the radial vanes are bevelled at 72a so that they fit in-between the bobbins fed thereto and move them along the supporting base to bobbin applying position.

As the bobbins approach the end of the supporting base, the pivoted fingers 77 which are mounted on forwardly and upwardly extending pivots 79 which, as indicated in FIGS. 3 to 7, are substantially perpendicular to a radius passing through the rotating shaft and the axis of the bobbin, will be moved into projected position by a fixed cam 80. They have a curved outer portion 77a which is adapted to engage the bobbin and hold it steady to prevent it from tilting as it moves to the bobbin applying position and moves with the bobbin without interference, as controlled by the inclined pivots, as it falls from that position. Thereafter, the fingers are in retracted position and continue to move with the shaft until their return to extended bobbin engaging position.

While power for operating the donning device may be obtained in various ways, it is herein illustrated as being supplied by a main drive shaft 91 carried by the plate 41 and driven by a star wheel 92 carried by a gear 92a mounted on a gear box 93 on the plate 41 and connected thereto. The star wheel is located, when the plate 41 is in projected operative position, so as to engage the spindles on the frame, as shown in FIG. 9 and be rotated thereby in response to movement of the carriage along the frame.

Preferably an overload clutch is included in the driving connection of the star wheel to prevent damage to the spindles in the event the mechanism driven by the main shaft should jam or malfunction. In the illustrated form of the invention it comprises a releasable spring-pressed ball and socket clutch 95 as shown in FIG. 5.

The main drive shaft is connected, in the preferred form of the invention, to the vertical shaft 71 by a flexible drive belt 96 connecting a pulley 97 on the main drive shaft and a pulley 98 on the vertical shaft 71 of the bobbin applying mechanism. With this arrangement the applying of the bobbins can be readily controlled by or coordinated with the spindles as the carriage is moved along the frame.

The donning plate is provided on its face with a downwardly inclined chute 100 (FIG. 2) for receiving bobbins from the bobbin supply means through a horizontal opening 101 and feeding them by gravity to said bobbin applying means. While the chute can feed the bobbins one at a time, it is preferred to use it as a reservoir for holding a plurality of bobbins, as shown in FIG. 2, to insure a ready supply for the bobbin applying mechanism and to also increase the capacity of the machine.

The chute or reservoir 100 has a guide plate 102 pivoted at the rear at 103 for engaging the butts of the bobbins to guide them downwardly while the uppermost bobbin in the reservoir forms a fulcrum point adjacent the forward end of the bobbin for causing the bobbins to be tilted so that they fall butt first. The pivoted guide plate permits the yielding of the plate as the donning mechanism is returned to retracted position.

While the means for supplying empty bobbins to the bobbin supply means for the donning device can comprise one or more upright containers mounted in the enclosure 45 and preferably having a series of compartments in side-by-side relation for holding the empty bobbins in columns with the lowermost bobbins disposed in substantially a horizontal position, in the illustrated form of the invention a pair of containers 104, 105 are employed in stacked relation.

The two containers are preferably identical and greatly facilitate the handling of the bobbin supply because of the reduction in weight and size thereof. Each container comprises a plurality of compartments 106 which are open at the bottom and may be open at the top. The bobbins are stacked in the compartments in columns and move out of the compartments by gravity through the open bottoms as will be explained.

Figure 11A:
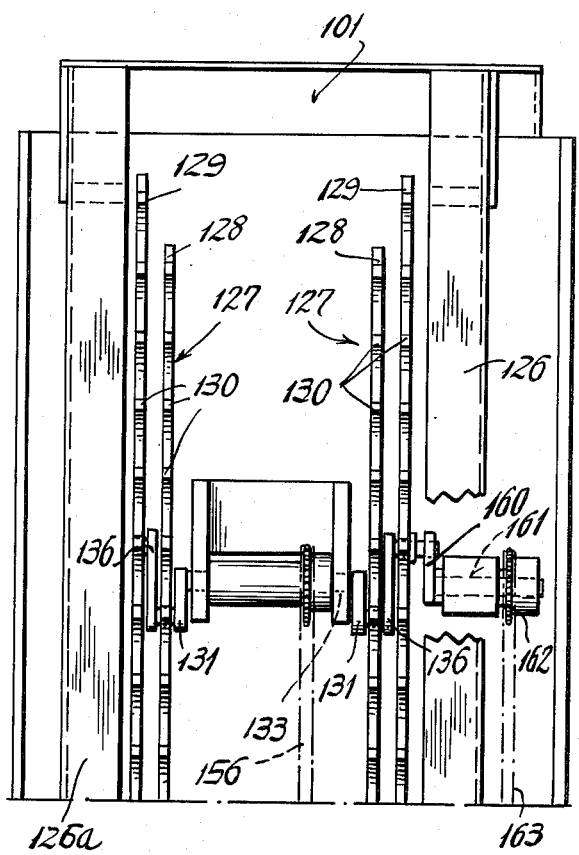
FIG. 11A is a view taken on line 11A—11A of FIG. 10A showing the upper part of the vertical feed means with the bobbins removed.

A closure plate 107 is normally carried in grooves 108 extending along the sides of the container, as shown in FIG. 18, to retain the bobbins therein when the containers are loaded and handled as they are put in position on the machine. The containers are inserted into the rear of the bobbin supply enclosure 45 on the carriage and can be supported on rollers 109 as shown in FIGS. 1 and 11, or by clips 110 as shown in FIG. 18. After the container has been put in position, the closure plate is removed to permit the bobbins to move downwardly into feeding position.

In some instances it may be desired to support the weight of part of the bobbins during the feeding operation to relieve the load on the feeding mechanism. In this case, a plate 111 having an aperture 111a therein, as shown in FIGS. 16 and 17, is inserted in the grooves 108 along the side of the container after the plate 107 is removed so as to close off and support a predetermined number of the vertical columns to prevent feeding thereof to the feeding mechanism. After the columns have been emptied through the aperture, the slide is removed, permitting the remaining columns to become effective to supply bobbins to the feeding mechanism.

While the bobbins may be fed in various angular relations to the reservoir, in the illustrated form of the invention they are transported in a horizontal position by a novel feed mechanism.

Figure 10:
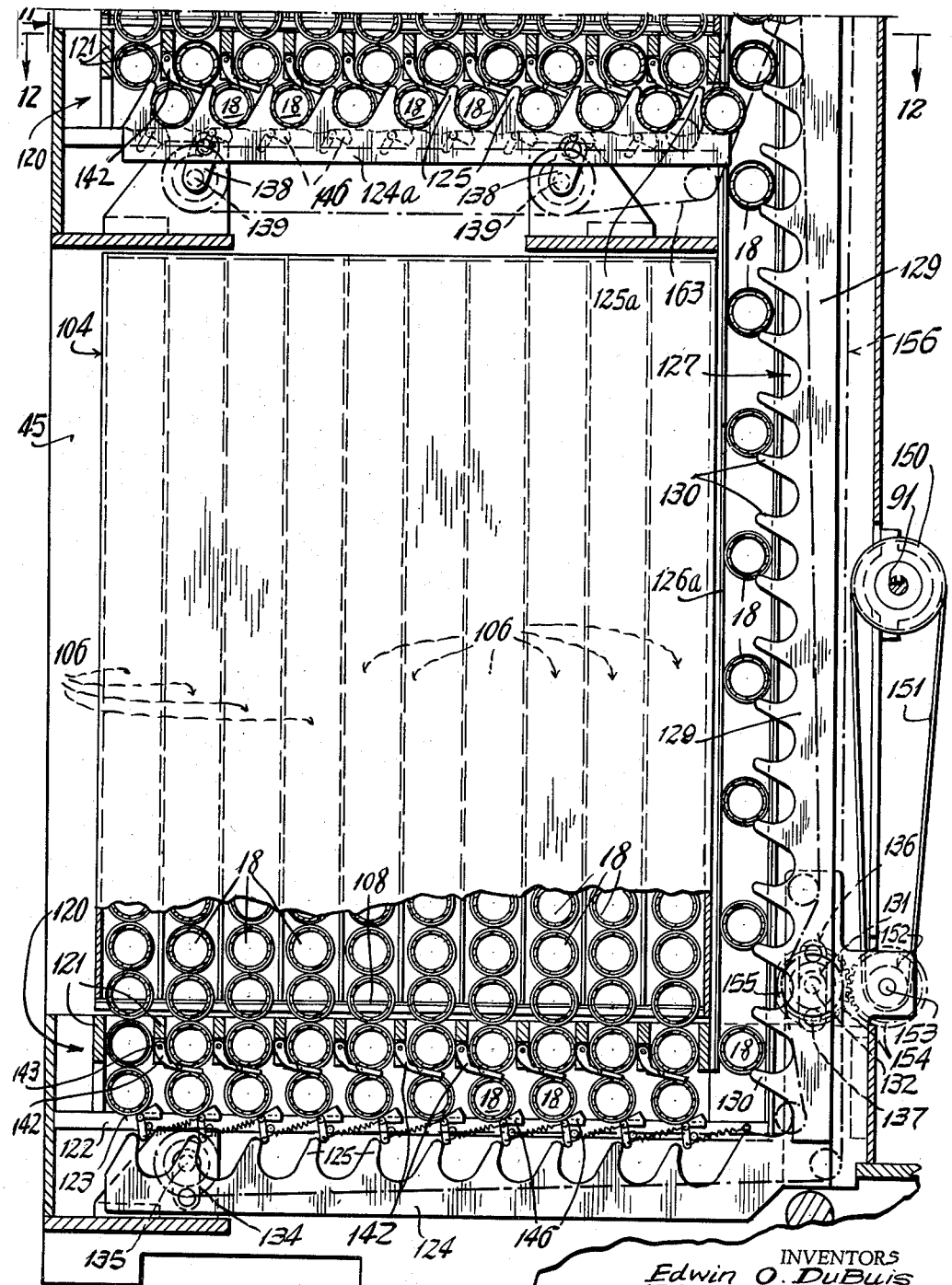
FIG. 10 is a side view of the bobbin supply means.

As shown in FIG. 10, there is disposed below each container a nacelle 120 comprising a plurality of dividers 121 forming passages aligned with the compartments in the containers and of a depth to hold two bobbins, the lower bobbins being supported by a fixed support means comprising a pair of horizontal bars 122 for engaging the tip and butt of the bobbins, each bar having notches 123 aligned with the passages. Preferably, the bottom edge of the dividers 121 is disposed above the support bar 122 a distance sufficient to permit only the bobbins supported thereon to be fed along the support bar by the feeding means.

The transverse feeding means for the nacelle comprises a pair of plates or feed elements 124 for the lower nacelle and a pair of plates 124a for the upper nacelle, said plates being disposed adjacent the support bars in a position to engage the butt and tip ends of the bobbins supported thereon. The plates are provided with upwardly projecting fingers 125 located on the plates a distance substantially equal to the spacing of the passages and, in effect, form rakes having sockets to receive the bobbins. The plates are mounted for movement in a plane perpendicular to the axis of the bobbin and are actuated to progressively move the bobbins carried by the support bars to an escalator device adjacent the donning device. The escalator device herein illustrated comprises a plurality of upwardly extending guide channels 126, 126a for engaging and guiding the tip and butt portions of said bobbins and vertically movable feed members or lifter plates 127 forming an inner set 128 and an outer set 129, each of the plates having projecting fingers 130 forming rakes thereon for progressively lifting the bobbins upwardly along the channels toward the opening 101.

In the herein illustrated form of the invention the plates 124 of the feed for the lower nacelle have their forward ends connected to the bottom of the inner set 128 of the vertical feed members to move therewith, as shown in FIG. 10.

FIGS. 10 to 12 show a preferred form of means for operating the feed members to advance the bobbins step-by-step. The inner set of feed members 128 are carried by crank arms 131 mounted on shafts 132 and 133, and the rear ends of the lower feed members 124 are carried by crank arms 134 mounted on shaft 135. The outer set of vertical feed members 129 are actuated by crank arms 136 carried by pins 137 extending from arms 131 and move the outer set 180° out of phase with the inner set. The upper feed members 124a are driven by crank arms 138 adjacent each end and are mounted on shafts 139.

Figure 14:
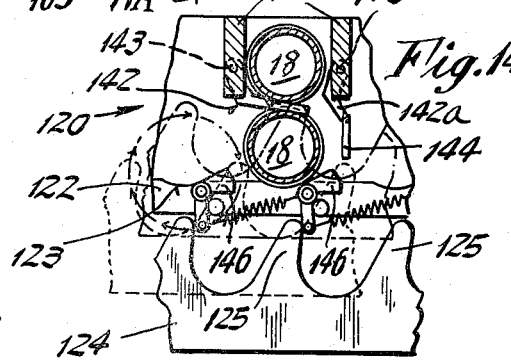
FIG. 14 is an enlarged detailed view of the horizontal feed means showing one form of bobbin control.

The crank arms move the feed members 124, 124a with a substantially circular motion, as shown in FIG. 14, and move the fingers above the support bar and into feeding relation only during the upper half of the circular path to feed the bobbins one step or compartment space for each rotation of the shaft. As will be noted in FIG. 10, the upper and lower transverse feed members are operated so as to be 180° out of phase.

Figure 13:
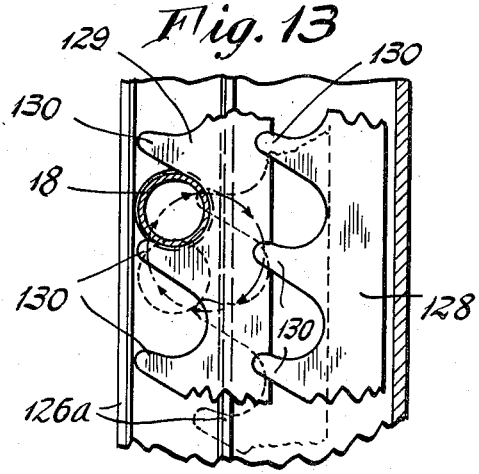
FIG. 13 is an enlarged detailed view of the vertical feed means.

As shown in FIG. 13, the fingers on each set of vertical feed members, as they move with a circular motion, alternately project into supporting and feeding relation with the bobbins in the channel guides and each move the bobbins one step in a half revolution or a total of two steps for each rotation of drive shafts operating the crank arms therefor.

Figure 10A:
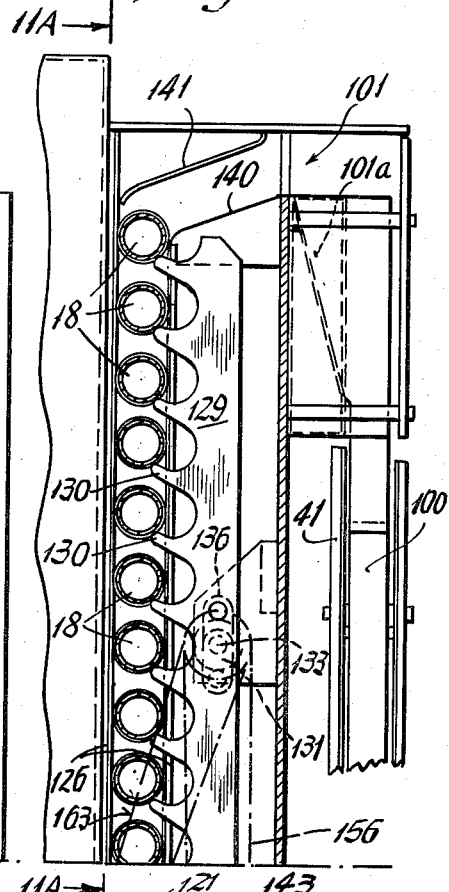
FIG. 10A is the upper continuation of the escalator on vertical feed means of the bobbin supply means.

Preferably, the transverse feed plates and the vertical plates are so coordinated in their operation that the transverse lower unit feeds a bobbin to every other feeding member of the escalator unit and the upper transverse unit feeds a bobbin to the remaining feeding members, as is clear from FIGS. 10 and 10A. Thus, the two transverse units supply all of the bobbins necessary to fill the upper portion of the escalator unit and supply the donning device with empty bobbins. If desired, the last finger 125a on plate 124a may be slightly thickened, as shown in FIG. 10, to insure the feeding of the last bobbin on the support through the adjacent wall and into the channels to be fed by the vertical feed members.

When the bobbins reach the top of the guide channels, they are fed up an inclined surface 140 adjacent each guide channel to the horizontal opening 101 through which they pass over a spillway 101a to the chute or reservoir. If desired, spring fingers 141 can be disposed above the inclined surfaces to engage and steady the bobbins thereon and to insure proper delivery thereof into the chute.

In order to control the bobbins as they move from the vertical columns to be fed by the horizontal feed plates 124, 124a, the present invention provides means for controlling the bobbns in the compartments or chutes so as to reduce the load of the bobbins on the feeding means, as would be created by the bobbins in the chute were they permitted to fall in the void between the bobbins on the supporting bars as said bobbins are fed therealong by the feeding means.

In one form of the invention, as shown in FIGS. 10, 14 and 14A, this means comprises a pair of articulated members 142 for each column, other than the first column, in the container. The articulated member as shown in FIG. 14A comprises a heel portion 142a which is pivoted on a pivot pin 143 to the bottom of the dividers of the nacelle and is normally supported in a dependent position, as shown at the right of FIG. 14. The heel portion has a toe portion 144 pivoted thereto by pivot pin 145 with the back of the shoe forming a stop to limit its upward movement to the solid position of FIG. 14 in which it extends over the bobbin on the support bar and forms a ceiling for the feeding bobbins.

When a full container of empty bobbins is positioned over the nacelle and the shutter withdrawn, all of the vertical columns will drop two bobbins to fill the two layer requirement of the nacelle. The first movement of the feed bars feeds the bottom layer of bobbins one increment. This will cock the members 142 into the position shown in FIG. 10. In this position only the last column will continue to feed since there is no member 142 to be raised. As the column is emptied, the last bobbin, as it feeds from under the next compartment, will permit the member 142 to drop and open up the new column of bobbins. This action continues until all of the columns have been emptied.

If desired, spring-pressed latch or stop plates 146 can be pivotally mounted on each supporting rail adjacent the notches therein to prevent the bobbins from shifting position under the action of the members 142 or otherwise assuming a skewed position, said latch plates also functioning to control the bobbins during the initial contact thereof by the feed fingers to insure that they will be retained by the feed fingers and advanced forwardly. As the bobbins advance, they will cause the pivoted spring-pressed latch plates to be depressed and control the bobbin as it is fed. The latch returns to its normal position as soon as the bobbins have been fed to the required step as shown in FIG. 14.

In the form of the invention shown in FIG. 15, a rocker device 147 for controlling the movement of the empty bobbins from the chutes is mounted in the nacelle between and below each pair of bobbin chutes in the containers for the empty bobbins. These feed into a funnel structure 147, 147a disposed above the stationary rail 120 with a spacing of twice the spacing of the fingers on the movable plate. The rockers are actuated by a rocker link 148 driven by a crank arm 149 and are moved at the rate of one-fourth of the speed of the vertical feed members, while the bottom feed members move at twice the speed of the vertical feed members, thus accurately controlling the feed of the empty bobbins.

While any suitable drive may be used to operate the feed means, in the illustrated form of the invention a sprocket and chain drive system is employed. It is preferably driven from the main drive shaft 91 which also drives the bobbin applying mechanism so that the coordination of the bobbin supply means and the empty bobbin supply means therefor will always be coordinated with the latter supplying a bobbin for each bobbin applied to a spindle.

As shown in FIGS. 2 and 10 to 12, the drive means comprises a fixed pulley 150 slidably mounted on the main drive shaft 91. The pulley 150, through a belt 151 and pulley 152 drives a countershaft 153 which is geared by gears 154 to rotate shaft 132. Shaft 132 has a drive sprocket 155 thereon which through the chain and sprocket drive 156 (FIGS. 11, 11A) rotates the shaft 133 and thus drives the crank arms 131 and 136 to operate the vertical feed means. Shaft 132 also has a sprocket 157 which through the chain and sprocket drive 158 rotates the shaft 135 to operate the lower feed means 124. As shown in FIGS. 11A and 12, the outer set 129 through a crank arm 160 drives a stub shaft 161 having a sprocket 162 thereon which through the chain and sprocket drive 163 rotates the shafts 139 and crank arms 138 for the upper feed means 124a. Thus, it will be seen that a compact, integrated flexible drive system is provided for operating the crank arms for actuating the feed members in coordination with the bobbin applying means.

If desired, a handwheel 164, as shown in FIG. 11 can be connected on the sprocket and chain means 163 for driving the whole sprocket and chain system when it is desired to manually feed bobbins to load the escalator unit and reservoir prior to the time when the device is mounted on the frame to be driven by the spindles.

As previously noted, any jamming or malfunctioning of the mechanism driven by the main shaft cannot damage the spindles because of the overload clutch 95. Further, in the preferred form of the invention the balls and sockets constituting the clutch 95 are disposed at 90° and in predetermined relation with the projections of the four tooth star wheel 92 and no retiming of the star wheel is required when the clutch means is re-engaged.

Variations and modifications may be made within the scope of the claims and portions of the improvements may be used without others.

We claim:

1. A doffing and donning device comprising a carriage adapted to be mounted for movement on horizontal rails extending along a side of a spinning machine having a row of spindles thereon, said carriage comprising a frame having rail engaging rollers, a subframe having floor-engaging wheels, and means connecting the frame and subframe, including master and slave cylinders for relative vertical movement of the main frame for raising the rail engaging rollers above the height of the horizontal rails; a hydraulic circuit for operating said cylinders;

and control means for the hydraulic circuit including movable controllers for engaging the rail, link means connected to said controllers, and a control valve for the master and slave cylinders normally blocking the pressure line for the master cylinder from a return reservoir and rendering the master and slave cylinders operative to lift the frame, said controllers when the frame is in parallel relation with the rail and the rollers are disposed above the rail automatically actuating the valve to connect the master and slave cylinders to the reservoir and deenergize said cylinders and causing the frame and the rail engaging rollers to descend to supporting relation with the rail for mounting the carriage on the rail for movement therealong.

2. A doffing and donning device comprising a carriage adapted to be mounted for movement on horizontal rails extending along a side of a spinning machine having a row of spindles theron, said carriage comprising a frame having rail engaging rollers, a subframe having floor-engaging wheels, and means connecting the frame and subframe, including master and slave cylinders for relative vertical movement of the main frame for raising the rail engaging rollers above the height of the horizontal rails; a hydraulic circuit for operating said cylinders; and control means for the hydraulic circuit including movable controllers for engaging the rail, link means connected to said controllers, and a control valve for the master and slave cylinders normally blocking the pressure line for the master cylinder from a return reservoir and rendering the master and slave cylinders operative to lift the frame, said controllers when the frame is in parallel relation with the rail and the rollers are disposed above the rail automatically actuating the valve to connect the master and slave cylinders to the reservoir and deenergize said cylinders and causing the frame and the rail engaging rollers to descend to supporting relation with the rail for mounting the carriage on the rail for movement therealong, means actuating one of the controllers adjacent the end of movement of the carriage along the rail to return the valve to blocking position, and means thereafter connecting a source of fluid under pressure to said master and slave cylinders to automatically raise the frame and rail engaging rollers from the rail and support the carriage on the floor whereby the carriage can be readily removed from the rails of the spinning machine.

3. A doffing and donning device comprising a carriage adapted to be mounted for movement on horizontal rails extending along a side of a spinning machine having a row of spindles thereon; doffing and donning devices movably mounted on the carriage and having piston and cylinder means for moving said devices between a retracted and a projected operative position; a hydraulic circuit for operating said cylinders; and means for controlling the hydraulic circuit incident to the movement of the carriage along the machine including normally closed poppet valves disposed in the lines connected to the head and rod ends of the cylinder of the piston and cylinder means, a sequence valve mounted on the carriage and connecting said lines to a source of fluid under pressure and to a return reservoir, means actuating the sequence valve prior to the carriage reaching the last spindle of the row to connect the source of pressure to the lines adapted to retract the doffing and donning devices when the poppet valves therein are opened, and means adjacent said last spindle for momentarily operating said valves to automatically retract said devices to retracted position as the carriage reaches said last spindle, said valves thereafter closing and holding the devices in said retracted position.

4. A doffing and donning device comprising a carriage adapted to be mounted for movement on horizontal rails extending along a side of a spinning machine having a row of spindles thereon; doffing and donning devices movably mounted on the carriage and having piston and cylinder means for moving said devices between a retracted and a projected operative position; a hydraulic circuit for operating said cylinders; and means for controlling the hydraulic circuit incident to the movement of the carriage along the machine including normally closed poppet valves disposed in the lines connected to the head and rod ends of the cylinder of the piston and cylinder means, a sequence valve mounted on the carriage and connecting said lines to a source of fluid under pressure and to a return reservoir, means actuating the sequence valve prior to the carriage reaching the first spindle of the row to connect the source of pressure to the lines adapted to project the doffing and donning devices when the poppet valves therein are opened, and means adjacent said first spindle for momentarily operating said poppet valves to automatically project said devices to operative position as the carriage reaches said first spindle, said valves thereafter closing and holding the devices in said position.

5. A doffing and donning device comprising a carriage adapted to be mounted for movement on horizontal rails extending along a side of a spinning machine having a row of spindles thereon; doffing and donning devices movably mounted on the carriage and having piston and cylinder means for moving said devices between a retracted and a projected operative position; a hydraulic circuit for operating said cylinders; and control means for the hydraulic circuit including normally closed poppet valves disposed in the lines connected to the head and rod ends of the cylinder of the piston and cylinder means, a sequence valve connecting said lines to a source of fluid under pressure and to a return reservoir, means on the machine in advance of the first spindle for actuating the sequence valve to connect the source of pressure to the lines adapted to project the doffing and donning devices when the poppet valves therein are opened, means adjacent the first spindle on the spinning machine for momentarily operating said poppet valves to automatically project said devices to operative position as the carriage reaches said first spindle, said poppet valves thereafter closing and holding the devices in said projected position, means mounted on the machine in advance of the last spindle for operating the sequence valves for applying pressure to the lines to retract the doffing and donning devices when the poppet valves are operated, and means located at the last spindle for momentarily opening the poppet valves to retract the doffing and donning devices, said poppet valves thereafter closing and holding said devices in retracted position.

6. A doffing and donning device comprising a carriage adapted to be mounted for movement on horizontal rails extending along a side of a spinning machine having a row of spindles thereon, said carriage comprising a frame having rail engaging rollers, a subframe having floor-engaging wheels, and means connecting the frame and subframe, including master and slave cylinders for relative vertical movement of the frame for raising the rail engaging rollers above the height of the horizontal rails; doffing and donning devices movably mounted on the carriage and having piston and cylinder means for moving said devices between a retracted and a projected operative position; a hydraulic circuit for operating said master and slave cylinders and said piston and cylinder means; and control means in the hydraulic circuit including movable controllers for engaging the rail, link means connected to said controllers, and a control valve for the master and slave cylinders normally blocking the pressure line for the master cylinder from a return reservoir and rendering the master and slave cylinders operative to lift the frame, said controllers when the frame is in parallel relation with the rail and the rollers are disposed above the rail automatically actuating the valve to connect the master and slave cylinders to the reservoir and deenergize said cylinders and causing the frame and the rail engaging rollers to descend to supporting relation with the rail for mounting the carriage on the rail for movement therealong, means actuating one of the controllers adjacent the end of movement of the carriage along the rail to return the valve to blocking position, said hydraulic circuit also including normally closed poppet valves disposed in lines connected to the head and rod ends of the cylinder of the piston and cylinder means, a sequence valve connecting said lines to a source of fluid under pressure and to a return reservoir, means on the machine in advance of the first spindle for actuating the sequence valve to connect the source of pressure to the lines adapted to project the doffing and donning devices when the poppet valves therein are opened, means adjacent the first spindle on the spinning machine for momentarily operating said poppet valves to automatically project said devices to operative position as the carriage reaches said first spindle, said poppet valves thereafter closing and holding the devices in said projected position, means mounted on the machine in advance of the last spindle for operating the sequence valves for applying pressure to the lines to retract the doffing and donning devices when the poppet valves are operated, and means located at the last spindle for momentarily opening the poppet valves to retract the doffing and donning devices, said poppet valves thereafter closing and holding said devices in retracted position, and means controlled by the movement of the donning means to retracted position for connecting a source of fluid under pressure to said master and slave cylinders to automatically raise the frame and rail engaging rollers from the rail and support the carriage on the floor whereby the carriage can be readily removed from the rails of the spinning machine.

7. A device for donning empty bobbins on a row of spindles supported on a spinning frame comprising a carriage mounted on the spinning frame to move along a path parallel to the spindles; a donning means on the carriage having a bobbin applying means thereon adapted to be disposed in operative position above said spindles for applying bobbins to said spindles by gravity as the carriage moves along the side of the spinning frame, said bobbin applying means comprising a rotatable vertical shaft controlled by the position of said spindles; a supply of empty bobbins on the carriage; and means for feeding a bobbin from said supply to said bobbin applying means for each operation of the bobbin applying means, said vertical shaft having a plurality of bobbin control units thereon to receive bobbins from the supply means and deliver them to a delivery position in which the bobbins are released and fall by gravity to be impaled on the spindle disposed therebelow.

8. A device for donning empty bobbins on a row of spindles supported on a spinning frame comprising a carriage mounted on the spinning frame to move along a path parallel to the spindles; a supply of empty bobbins on the carriage; and means for feeding bobbins from said supply to a donning means on the carriage having a chute for receiving said bobbins and advancing them to a bobbin applying means thereon for applying bobbins on said spindles by gravity as the carriage moves along the side of the spinning frame, said bobbin applying means comprising a vertical rotatable shaft rotated in response to movement of the carriage and controlled by the position of said spindles, said shaft having a plurality of bobbin control units thereon to receive bobbins from the chute and deliver them to a delivery position in which the bobbins are released and fall by gravity to be impaled on a spindle disposed therebelow.

9. A device for donning empty bobbins on a row of spindles supported on a spinning frame comprising a carriage mounted on the spinning frame to move along a path parallel to the spindles; a supply of empty bobbins, each having a butt and tip portion, on the carriage; and means for feeding bobbins from said supply to a donning means on the carriage having means for receiving and holding a plurality of said bobbins in a vertical position with the butt portion down, and advancing said bobbins to a bobbin applying means thereon for applying the bobbin to said spindles seriatim as the carriage moves along the side of the spinning frame, said bobbin applying means comprising a vertical shaft rotated in response to movement of the carriage and controlled by the position of said spindles, and a butt supporting base concentric with the shaft and having a curved end portion defining a delivery position, said shaft having a plurality of bobbin control units thereon forming pockets to receive bobbins from said means for receiving and holding the bobbins and deliver them to said delivery position in which the bobbins are released from the base and descend butt portion first to be impaled on the spindle disposed therebelow.

10. A device for donning empty bobbins on a row of spindles supported on a spinning frame comprising a carriage mounted on the spinning frame to move along a path parallel to the spindles; a supply of empty bobbins on the carriage; and means for feeding bobbins having a butt and tip portion from said supply to a donning means on the carriage having an inclined chute forming a reservoir for receiving and holding a plurality of said bobbins in a vertical position with the butt portion down, and advancing said bobbins to a bobbin applying means thereon for applying the bobbins to said spindles by gravity as the carriage moves along the side of the spinning frame, said bobbin applying means including a vertical shaft rotated by a spindle engaging star wheel in response to movement of the carriage along the spinning frame, a base concentric with the shaft and having an end defining a delivery position, and butt and tip guides concentric with said shaft to guide the bobbins as they move over said base, said shaft having a plurality of bobbin control units thereon forming pockets to receive bobbins from the reservoir and deliver them to said delivery position in which the bobbins are released from the base and fall butt portion first by gravity to be impaled on the spindle disposed therebelow.

11. A device for donning empty bobbins on a row of spindles supported on a spinning frame comprising a carriage mounted on the spinning frame to move along a path parallel to the spindles; a supply of empty bobbins on the carriage; means for feeding bobbins from said supply to a donning means having a reservoir for receiving said bobbins and advancing them to a bobbin applying means thereon for applying bobbins to said spindles by gravity as the carriage moves along the side of the spinning frame; and a plate carrying said donning means for movement thereon in a plane perpendicular to said row of spindles from a retracted inoperative position to an operative bobbin applying position in which a bobbin is disposed above the spindle, said bobbin applying means comprising a vertical shaft rotated by a star wheel engaging the spindle to be driven thereby in response to movement of the carriage and having a plurality of bobbin control units thereon to receive bobbins from the reservoir and deliver them to a delivery position in which the bobbins are released to fall by gravity and be impaled on the spindle.

12. A device for donning empty bobbins on a row of spindles supported on a spinning frame comprising a carriage mounted on the spinning frame to move along a path parallel to the spindles; a supply of empty bobbins on the carriage; and means for feeding bobbins from said supply to a donning means on the carriage having a reservoir for receiving said bobbins and advancing them to a bobbin applying means thereon for applying bobbins to said spindles by gravity as the carriage moves along the side of the spinning frame, said bobbin applying means comprising a vertical shaft rotated in response to movement of the carriage and controlled by the position of said spindles, said shaft having a plurality of bobbin control units comprising rigid radial vanes forming open pockets thereon to receive bobbins from the reservoir and deliver them to a delivery position in which the bobbins are released and fall by gravity to be impaled on a spindle disposed therebelow, and pivoted control fingers associated with said vanes and movable from a dependent inoperative position to a projected controlling position for cooperating with said vanes for controlling at least the empty bobbin in said delivery position to prevent titlting thereof prior to and during the release thereof from said delivery position.

13. A device for donning empty bobbins on a row of spindles supported on a spinning frame comprising a carriage mounted on the spinning frame to move along a path parallel to the spindles; a donning means on the carriage having a bobbin applying means thereon adapted to be disposed in operative position above said spindles for applying bobbins to said spindles by gravity as the carriage moves along the side of the spinning frame, said bobbin applying means comprising a rotatable vertical shaft controlled by the position of said spindles, and a supply of empty bobbins on the carriage; and means controlled by said spindles for feeding a bobbin from said supply to said bobbin applying means for each operation of the bobbin applying means, said vertical shaft having a plurality of bobbin control units having rigid radial vanes thereon forming pockets to receive bobbins from the supply means and deliver them to a delivery position in which the bobbins are released and fall by gravity to be impaled on the spindle disposed therebelow, said control units also having pivoted control fingers provided with curved bobbin engaging end portions, and cam means for moving said fingers from a dependent inoperative position to a projected controlling position with the curved end portion engaging bobbins positioned by said vanes in delivery position for controlling the empty bobbin in said delivery position to prevent tilting of the bobbin prior to and during the release thereof from said delivery position.

14. A device for donning empty bobbins on a row of spindles supported on a spinning frame comprising a carriage mounted on the spinning frame to move along a path parallel to the spindles; a donning means on the carriage having a bobbin applying means thereon adapted to be disposed in operative position above said spindles for applying bobbins to said spindles by gravity as the carriage moves along the side of the spinning frame, said bobbin applying means comprising a rotatable vertical shaft controlled by the position of said spindles, and a supply of empty bobbins on the carriage; and means controlled by said spindles for feeding a bobbin from said supply to said bobbin applying means for each operation of the bobbin applying means, said vertical shaft having a plurality of bobbin control units having rigid radial vanes thereon forming pockets to receive bobbins fed from the supply means and deliver them to a delivery position in which the bobbins are released and fall by gravity to be impaled on the spindle disposed therebelow, said control units also having control fingers mounted on pivots located at right angles to a radius passing through the shaft and the bobbin and forwardly in the direction of rotation of the shaft and upwardly from said radius and associated with said vanes and movable in response to rotation of said shaft from a dependent inoperative position to a projected controlling position for engaging bobbins positioned by said vanes in delivery position for controlling the empty bobbin in said delivery position to prevent tilting of the bobbin prior to and during the release thereof from said delivery position.

15. A device for donning empty bobbins on a row of spindles supported on a spinning frame comprising a carriage mounted on the spinning frame to move along a path parallel to the spindles; a supply of empty bobbins on the carriage; and means for feeding bobbins from said supply to a donning means having a reservoir for receiving said bobbins and advancing them to a bobbin applying means thereon for applying bobbins to said spindles by gravity as the carriage moves along the side of the spinning frame, said bobbin supply comprising a plurality of vertical compartments open at the bottom and disposed in side-by-side relation having columns of transversely disposed empty bobbins therein to feed from said open bottom, and said means for feeding the bobbins comprising horizontal fixed bobbin support means having shallow bobbin receiving recesses therein in line with and below said compartments adapted to hold a bobbin therein in feeding position and a pair of horizontal feed plates spaced apart a distance to engage the bobbins adjacent the ends thereof and having a plurality of fingers spaced thereon a distance apart having a predetermined relation to said compartments to engage the bobbins in feeding relation, said feed plates being mounted for movement in a plane perpendicular to the axis of said empty bobbins, and means causing said plates to move the fingers in a circular path having an amplitude sufficient to step the bobbins supported on the support means a predetermined distance toward said reservoir, and means controlling the feed of the bobbins to said supporting means to prevent undue load on the feeding means.

16. The invention as defined in claim 15 wherein said last means comprises pivoted articulated two-part fingers disposed below the column in position to rest on said bobbins on the supporting means and extend thereover to form a ceiling to prevent the bobbins in the column from descending into the voids between the bobbins on said supporting means and increasing the force needed to advance the bobbins therealong.

17. The invention as defined in claim 15 wherein the last means comprises a rocker member disposed below said bobbins for supporting said columns and feeding a bobbin therefrom to the supporting means for each rocking operation thereof, and a crank arm driven in timed relation with the feed means for rocking the rocker member.

18. The invention as defined in claim 15 wherein the last means comprises an apertured shutter plate having an opening therein adapted to be mounted below the containers to support bobbins therein and selectively permit said columns to feed through said opening.

19. A device for donning empty bobbins on a row of spindles supported on a spinning frame comprising a carriage mounted on the spinning frame to move along a path parallel to the spindles; a supply of empty bobbins on the carriage; and means for feeding bobbins from said supply to a donning means having a bobbin applying means thereon for applying bobbins to said spindles by gravity as the carriage moves along the side of the spinning frame, said bobbin supply comprising a plurality of stacked containers each having vertical compartments open at the bottom and disposed in side-by-side relation and having columns of transversely disposed empty bobbins therein to feed from said open bottom; means for feeding the bobbins from said supply comprising a nacelle disposed below each container and having dividers forming passages below and aligned with said compartments and horizontal bobbin support means having shallow bobbin receiving recesses therein, said support means being disposed below said dividers a distance slightly greater than the diameter of a bobbin, a pair of horizontal feed plates located adjacent the support means and having a plurality of fingers spaced thereon a distance apart having a predetermined relation to said passages and adapted to engage the bobbins in feeding relation adjacent the ends thereof, said feed plates being mounted for movement in a plane perpendicular to the axis of said empty bobbins, and means causing said plates to move the fingers in a circular path and to engage the bobbins during a portion of their movement in said path to feed the bobbins supported on the support means step by step a predetermined distance toward said donning means.

20. A device for donning empty bobbins on a row of spindles supported on a spinning frame comprising a carriage mounted on the spinning frame to move along a path parallel to the spindles; a supply of empty bobbins on the carriage; and means for feeding bobbins from said supply to a donning means having a reservoir for receiving said bobbins and advancing them to a bobbin applying means thereon for applying bobbins to said spindles by gravity as the carriage moves along the side of the spinning frame, said bobbin supply comprising upper and lower units, each having a plurality of vertical compartments open at the bottom and disposed in side-by-side relation and having columns of transversely disposed empty bobbins therein to feed from said open bottom, and said means for feeding the bobbins comprising a pair of horizontal feed devices located below said units and a vertical feed device cooperating with said horizontal feed devices to receive bobbins therefrom and feed them upwardly and into said reservoir, each of said horizontal feed devices comprising a pair of feed plates located adjacent each end of the bobbins having a plurality of fingers spaced thereon a distance apart having a predetermined relation to said compartments and forming bobbin receiving sockets, said feed plates being mounted for movement in a plane perpendicular to the axis of said empty bobbins, eccentric means operating said plates to move the fingers in a circular path having an amplitude sufficient to step the bobbins carried in the sockets a predetermined distance toward said vertical feed device, and means operating the vertical feed device in timed relation to the horizontal feed devices to receive the bobbins from the horizontal feed devices and moving the bobbins to said reservoir.

21. A device for donning empty bobbins on a row of spindles supported on a spinning frame comprising a carriage mounted on the spinning frame to move along a path parallel to the spindles; a supply of empty bobbins on the carriage; and means for feeding bobbins from said supply to a donning means having a reservoir for holding bobbins for a bobbin applying means thereon, to apply bobbins to said spindles by gravity as the carriage moves along the side of the spinning frame, said bobbin supply comprising a plurality of stacked containers each having vertical compartments open at the bottom and disposed in side-by-side relation having columns of transversely disposed empty bobbins therein to feed from said open bottom, and said means for feeding the bobbins from said supply to said donning means comprising a nacelle disposed below each container and an escalator device at one end of the nacelles to receive bobbins therefrom and feed them to said reservoir, said nacelles having dividers forming passages below said compartments and horizontal bobbin support means having shallow bobbin receiving recesses therein disposed below said dividers and adapted to hold a bobbin therein, a pair of horizontal feed plates located adjacent the support means and having a plurality of fingers spaced thereon a distance apart having a predetermined relation to said compartments and adapted to engage the bobbins in feeding relation adjacent the ends thereof, said feed plates being mounted for movement in a plane perpendicular to the axis of said empty bobbins, and means causing said plates to move the fingers in a circular path and to engage the bobbins during a portion of said path to feed the bobbins supported on the support means step by step a predetermined distance toward said escalator device, said escalator device comprising a pair of guide channels for receiving the ends of the bobbins fed thereto by the feed means of the nacelle and two pairs of feed plates extending for the length thereof, said plates having bobbin engaging fingers for engaging and advancing the bobbins along said guide channels, means for actuating the pairs of plates to move the fingers through a circular path intersecting the plane of the guide channels, the movement of each pair of plates being 180° out of phase with one another whereby the fingers on each pair of plates alternately engage the bobbins and advance them one step toward said reservoir.

22. A device for donning empty bobbins on a row of spindles supported on a spinning frame comprising a carriage mounted on the spinning frame to move along a path parallel to the spindles; a supply of empty bobbins on the carriage; and means for feeding bobbins from said supply to a donning means having a reservoir for holding bobbins for a bobbin applying means thereon, to apply bobbins to said spindles by gravity as the carriage moves along the side of the spinning frame, said bobbin supply comprising a plurality of stacked containers each having vertical compartments open at the bottom and disposed in side-by-side relation having columns of transversely disposed empty bobbins therein to feed from said open bottom, and said means for feeding the bobbins from said supply to said donning means comprising a nacelle disposed below each container and an escalator device at one end of the nacelles to receive bobbins therefrom and feed them to said reservoir, said nacelles having dividers forming passages below said compartments and horizontal bobbin support means having shallow bobbin receiving recesses therein disposed below said dividers and adapted to hold a bobbin therein, a pair of horizontal feed plates located adjacent the support means and having a plurality of fingers spaced thereon a distance apart having a predetermined relation to said compartments and adapted to engage the bobbins in feeding relation adjacent the ends thereof, said feed plates being mounted for movement in a plane perpendicular to the axis of said empty bobbins, and means causing said plates to move the fingers in a circular path and to engage the bobbins during a portion of said path to feed the bobbins supported on the support means step by step a predetermined distance toward said escalator device, said escalator device comprising a pair of guide channels for receiving the ends of the bobbins fed thereto by the feed means of the nacelle and two pairs of feed plates extending for the length thereof, said plates having bobbin engaging fingers for engaging and advancing the bobbins along said guide channels, means for actuating the pairs of plates to move the fingers through a circular path intersecting the plane of the guide channels, the movement of each pair of plates being 180° out of phase with one another whereby the fingers on each pair of plates alternately engage the bobbins and advance them to the top of said guide channels, and an inclined feed means at the ends of said channels to receive bobbins therefrom and feed them to a spillway for said reservoir.

23. A device for donning empty bobbins on a row of spindles supported on a spinning frame comprising a carriage mounted on the spinning frame to move along a path parallel to the spindles; a supply of empty bobbins on the carriage; and means for feeding bobbins from said supply to a donning means on the carriage having a reservoir for receiving said bobbins and advancing them to a bobbin applying means thereon for applying bobbins to said spindles by gravity as the carriage moves along the side of the spinning frame, and a main shaft having a star wheel drivingly connected thereto by an overload release clutch and rotated by the spindles in response to movement of the carriage, said main shaft driving said means for feeding the bobbins and said bobbin applying means.

24. A device for donning empty bobbins on a row of spindles supported on a spinning frame comprising a carriage mounted on the spinning frame to move along a path parallel to the spindles; a supply of empty bobbins on the carriage; and means for feeding bobbins from said supply to a donning means having a reservoir for holding bobbins for a bobbin applying means thereon, to apply bobbins to said spindles by gravity as the carriage moves along the side of the spinning frame, said bobbin supply comprising a plurality of stacked containers each having vertical compartments open at the bottom and disposed in side-by-side relation having columns of transversely disposed empty bobbins therein to feed from said open bottom; means for feeding the bobbins from said supply to said donning means comprising transverse feed means below each container and an escalator device to receive bobbins therefrom and feed them to said reservoir, said escalator device comprising a pair of guide channels for receiving the ends of the bobbins fed thereto by the feed means of the nacelle and two pairs of feed plates extending for the length thereof, said plates having bobbin engaging fingers for engaging and advancing the bobbins along said guide channels, means for actuating the pairs of plates to move the fingers through a circular path intersecting the plane of the guide channels, the movement of each pair of plates being 180° out of phase with one another whereby the fingers on each pair of plates alternately engage the bobbins and advance them one step.

25. A device for donning empty bobbins on a row of spindles supported on a spinning frame comprising a carriage mounted on the spinning frame to move along a path parallel to the spindles; a supply of empty bobbins on the carriage; and means for feeding bobbins from said supply to a donning means having a reservoir for holding bobbins for a bobbin applying means thereon, to apply bobbins to said spindles by gravity as the carriage moves along the side of the spinning frame, said bobbin supply comprising a plurality of stacked containers each having vertical compartments open at the bottom and disposed in side-by-side relation having columns of transversely disposed empty bobbins therein to feed from said open bottom; means for feeding the bobbins from said supply to said donning means comprising a nacelle disposed below each container and an escalator device at one end of the nacelles to receive bobbins therefrom and feed them to said reservoir, said nacelles having dividers forming passages below said compartments and a fixed horizontal bobbin support means having shallow bobbin receiving recesses therein disposed below said dividers and adapted to hold a bobbin therein, a pair of horizontal feed plates located adjacent the support means and having a plurality of fingers spaced thereon a distance apart having a predetermined relation to said compartments and adapted to engage the bobbins in feeding relation adjacent the ends thereof, said feed plates being mounted for movement in a plane perpendicular to the axis of said empty bobbins, and means causing 180° out of phase operation of the plates in the nacelles to move the fingers in a circular path and to engage the bobbins during a portion of said path to feed the bobbins supported on the support means steps by step a predetermined distance toward said escalator device, said escalator device comprising a pair of guide channels for receiving the ends of the bobbins fed thereto by the feed means of the nacelles and two pairs of feed plates extending for the length thereof, said plates having bobbin engaging fingers for engaging and advancing the bobbins along said guide channels, means for actuating the pairs of plates to move the fingers through a circular path intersecting the plane of the guide channels, the movement of each pair of plates being 180° out of phase with one another whereby the fingers on each pair of plates alternately engage the bobbins and advance them one position, with the nacelles supplying bobbins to alternate positions.

26. A device for donning empty bobbins on a row of spindles supported on a spinning frame comprising a carriage mounted on the spinning frame to move along a path parallel to the spindles; a supply of empty bobbins on the carriage; and means for feeding bobbins from said supply to a donning means having a reservoir for holding bobbins for a bobbin applying means thereon, to apply bobbins to said spindles by gravity as the carriage moves along the side of the spinning frame, said bobbin supply comprising a plurality of stacked containers each having vertical compartments open at the bottom and disposed in side-by-side relation having columns of transversely disposed empty bobbins therein to feed from said open bottom; means for feeding the bobbins from said supply to said donning means comprising a nacelle disposed below each container and an escalator device at one end of the nacelles to receive bobbins therefrom and feed them to said reservoir, said nacelles having dividers forming passages below said compartments and horizontal bobbin support means having shallow bobbin receiving recesses therein disposed below said dividers and adapted to hold a bobbin therein, a pair of horizontal feed plates located adjacent the support means and having a plurality of fingers spaced thereon a distance apart having a predetermined relation to said compartments and adapted to engage the bobbins in feeding relation adjacent the ends thereof, said feed plates being mounted for movement in a plane perpendicular to the axis of said empty bobbins, a plurality of crank arms for causing said plates to move the fingers in a circular path and to engage the bobbins during a portion of said path to feed the bobbins supported on the support means step by step a predetermined distance toward said escalator device, said escalator device comprising a pair of guide channels for receiving the ends of the bobbins fed thereto by the feed means of the nacelles and two pairs of feed plates extending for the length thereof, said plates having bobbin engaging fingers for engaging and advancing the bobbins along said guide channels, a plurality of crank arms for actuating the pairs of plates to move the fingers through a circular path intersecting the plane of the guide channels, the movement of each pair of plates being 180° out of phase with one another whereby the fingers on each pair of plates alternately engage the bobbins and advance them one step toward said reservoir; and chain and sprocket drive means for operating said crank arms.

27. A device for donning empty bobbins on a row of spindles supported on a spinning frame comprising a carriage mounted on the spinning frame to move along a path parallel to the spindles; a supply of empty bobbins on the carriage; and means for feeding bobbins from said supply to a donning means on the carriage having a reservoir for receiving said bobbins and advancing them to a delivery end thereof adjacent a bobbin applying means thereon for applying bobbins to said spindles by gravity as the carriage moves along the side of the spinning frame, said bobbin applying means comprising a vertical shaft rotated by a main shaft driven by a star wheel and actuated by said spindles in response to movement of the carriage, said vertical shaft having a plurality of bobbin control units comprising rigid radial vanes forming open bobbin receiving pockets thereon movable into operative relation with bobbins at the delivery end of the reservoir to deliver them to a delivery position in which the bobbins are released by the bobbin applying means and fall by gravity to be impaled on a spindle disposed therebelow, said control units also having control fingers pivoted on the shaft to be associated with said vanes and cooperating with a fixed cam to be moved thereby from a dependent inoperative position to a projected controlling position in response to movement of the shaft for engaging bobbins position by said vanes in delivery position for controlling the empty bobbin in said delivery position to prevent tilting of the bobbin prior to and during the release thereof from said delivery position, said supply of empty bobbins comprising a plurality of stacked containers each having vertical compartments open at the bottom and disposed in side-by-side relation having columns of transversely disposed empty bobbins therein to feed from said open bottom, and said means for feeding the bobbins from said supply to said donning means comprising a nacelle disposed below each container and an escalator device at one end of the nacelles to receive bobbins therefrom and feed them to said reservoir, said nacelles having dividers forming passages below said compartments and horizontal bobbin support means having shallow bobbin receiving recesses therein disposed below said dividers and adapted to hold a bobbin therein, a pair of horizontal feed plates located adjacent the support means and having a plurality of fingers spaced thereon a distance apart having a predetermined relation to said compartments and adapted to engage the bobbins in feeding relation adjacent the ends thereof, said feed plates being mounted for movement in a plane perpendicular to the axis of said empty bobbins, and crank arms causing said plates to move the fingers in a circular path and to engage the bobbins during a portion of said path to feed the bobbins supported on the support means step by step a predetermined distance toward said escalator device, said escalator device comprising a pair of guide channels for receiving the ends of the bobbins fed thereto by the feed means of the nacelles and two pairs of feed plates extending for the length thereof, said plates having bobbin engaging fingers for engaging and advancing the bobbins along said guide channels, crank arms for actuating the pairs of plates to move the fingers through a circular path intersecting the plane of the guide channels, the movement of each pair of plates being 180° out of phase with one another whereby the fingers on each pair of plates alternately engage the bobbins and advance them to the top of said guide channels, and an inclined feed means at the ends of said channels to receive bobbins therefrom and feed them to a spillway for said reservoir, said crank arms being operated by sprocket and chain drive means driven by said main shaft.

References Cited in the file of this patent
UNITED STATES PATENTS

| | | |
|---|---|---|
| 213,695 | Sanford | Mar. 25, 1879 |
| 1,120,626 | Peterson | Dec. 8, 1914 |
| 1,795,300 | Evcichjevitz | Mar. 10, 1931 |
| 2,141,470 | Harry | Dec. 27, 1938 |
| 2,668,713 | Anderson | Feb. 9, 1954 |
| 2,886,940 | Urano et al. | May 19, 1959 |
| 3,077,725 | Du Buis et al. | Feb. 19, 1963 |